United States Patent
Shiratori

[11] Patent Number: 5,949,743
[45] Date of Patent: Sep. 7, 1999

[54] MAGNETOOPTICAL RECORDING MEDIUM HAVING A BIAS LAYER RELATED BY CURIE TEMPERATURE TO A WRITING LAYER, WHICH IS CAPABLE OF BEING OVERWRITTEN BY LIGHT MODULATION

[75] Inventor: Tsutomu Shiratori, Tokyo, Japan

[73] Assignee: Canon Kabushiki Kaisha, Tokyo, Japan

[21] Appl. No.: 08/728,849

[22] Filed: Oct. 10, 1996

[30] Foreign Application Priority Data

Oct. 11, 1995 [JP] Japan .................................. 7-263039
Oct. 9, 1996 [JP] Japan .................................. 8-268693

[51] Int. Cl.$^6$ .................................................. G11B 11/00
[52] U.S. Cl. ........................................ 369/13; 428/694 EC
[58] Field of Search .............................. 369/13, 288, 272, 369/283; 428/694 EC, 694 MM, 694 MC, 694 SC; 365/112; 360/59, 114

[56] References Cited

U.S. PATENT DOCUMENTS

| | | | |
|---|---|---|---|
| 4,878,132 | 10/1989 | Aratani et al. | 360/59 |
| 4,955,007 | 9/1990 | Aratani et al. | 360/59 |
| 5,163,031 | 11/1992 | Osato | 369/13 |
| 5,164,926 | 11/1992 | Matsumoto | 369/13 |
| 5,191,561 | 3/1993 | Fukami et al. | 369/13 |
| 5,208,797 | 5/1993 | Fukami et al. | 369/100 |
| 5,216,663 | 6/1993 | Tsutumi et al. | 369/275.2 |
| 5,239,524 | 8/1993 | Sato et al. | 369/13 |
| 5,367,507 | 11/1994 | Sato et al. | 369/13 |
| 5,418,076 | 5/1995 | Shiratori | 428/694 EC |
| 5,440,531 | 8/1995 | Sato et al. | 369/13 |
| 5,458,987 | 10/1995 | Sato et al. | 428/694 EC |
| 5,475,657 | 12/1995 | Sato et al. | 369/13 |
| 5,481,410 | 1/1996 | Osato et al. | 369/13 |
| 5,512,366 | 4/1996 | Nakaki et al. | 428/332 |
| 5,525,378 | 6/1996 | Osato et al. | 427/535 |
| 5,539,709 | 7/1996 | Sato et al. | 369/13 |

FOREIGN PATENT DOCUMENTS

| | | |
|---|---|---|
| 0 288 069 A2 | 10/1988 | European Pat. Off. . |
| 0 382 859 A1 | 8/1990 | European Pat. Off. . |
| 0 411 860 A2 | 2/1991 | European Pat. Off. . |
| 0 440 486 A2 | 8/1991 | European Pat. Off. . |
| 0 487 847 A1 | 6/1992 | European Pat. Off. . |
| 62-175948 | 8/1987 | Japan . |
| 63-52354 | 3/1988 | Japan . |
| 63-153752 | 6/1988 | Japan . |
| 63-268103 | 11/1988 | Japan . |
| 1-241051 | 9/1989 | Japan . |
| 3-156751 | 7/1991 | Japan . |
| 3-219449 | 9/1991 | Japan . |
| 4-192138 | 7/1992 | Japan . |
| WO90/2400 | 3/1990 | WIPO . |

*Primary Examiner*—Ali Neyzari
*Attorney, Agent, or Firm*—Fitzpatrick, Cella, Harper & Scinto

[57] ABSTRACT

A magnetooptical recording medium has a stack of layers and is capable of being overwritten by light modulation. The recording medium has a writing layer in which information bits can be written, and a bias layer which generates a leaky magnetic field for writing information bits in the writing layer. The bias layer has a Curie temperature that is in the range of from $(T_2-90°$ C.) to $(T_2+5°$ C.), where $T_2$ is the Curie temperature of the writing layer, and the bias layer has a saturation magnetization at ambient temperature that is at least 350 emu/cc.

6 Claims, 14 Drawing Sheets

MAGNETOOPTICAL RECORDING MEDIUM HAVING A BIAS LAYER RELATED BY CURIE TEMPERATURE TO A WRITING LAYER, WHICH IS CAPABLE OF BEING OVERWRITTEN BY LIGHT MODULATION

BACKGROUND OF THE INVENTION

1. Field of the Invention

This invention relates to a magnetooptical recording medium capable of being overwritten by light modulation, and a recording method and apparatus using the medium.

2. Related Background Art

As techniques for overwriting magnetooptical recording media in the form of exchange coupled laminated magnetic films, the light modulation method and the magnetic field modulation method are known. The light modulation method is superior to the magnetic field modulation method in terms of the capability of high-speed modulation or the capability of using both sides of the medium and so on. Such a light modulation method is shown in Japanese laid open patents JP-A-62-175948, JP-A-63-52354 and JP-A-63-153752.

The basic process of overwriting by the light modulation method using exchange coupled laminated films is as follows. The exchange coupled laminated films usually basically comprise a first magnetic layer (memory layer) and a second magnetic layer (writing layer). The first magnetic layer comprises a material which has a relatively high coercivity at room temperature, and has a relatively low Curie temperature. On the other hand, the second magnetic layer comprises a material which has a relatively low coercivity at room temperature, and a relatively high Curie temperature. Between the two layers, at the interface, exchange coupling occurs. After irradiation by a laser during the cooling down period, the information bits (domains) recorded in the second magnetic layer are transferred to the first magnetic layer.

The laser irradiation is modulated to have two different laser powers to record the information. The first laser power heats the medium to a high temperature to record information bits in the second magnetic layer. The other laser power heats the medium to a low temperature to transfer the information bits of the second magnetic layer to the first magnetic layer.

After the laser irradiation, the temperature of the medium reduces to room temperature, and the required magnetic filed is applied to initialize the second magnetic layer. The information bits transferred to the first magnetic layer are not erased by the initializing magnetic field, because of the high coercivity of the first magnetic layer at room temperature. As a result, regardless of the condition of the first magnetic layer before the recording, newly recorded information in the second magnetic layer is usually recorded in the first layer and retained there to obtain overwriting.

However, the method described above requires means for the application of an initializing magnetic field. Therefore, the inconvenience of a large and complex recording apparatus occurs.

Some recording media designed to resolve the inconvenience described above are shown in JP-A-63-268103, JP-A-3-219449, or WO90/02400 and so on.

These improved media comprise laminated structure magnetooptical recording media to which has been added a third magnetic layer (switching layer) and a fourth magnetic layer (initializing layer) over the second magnetic layer of the exchange coupled laminated films. The third magnetic layer (switching layer) has a Curie temperature which is lower than that of the first magnetic layer and higher than room temperature. The fourth magnetic layer (initializing layer) has a Curie temperature which is higher than that of the second magnetic layer.

In these improved media, the fourth layer is previously initialized. After irradiation by the laser, while the temperature of the magnetooptic recording medium cools down to the room temperature, once the temperature of the optical magnetic recording medium is less than the Curie temperature of the third magnetic layer, an exchange coupling force operates between the second magnetic layer and the fourth magnetic layer and the second magnetic layer is initialized. Otherwise, the overwriting is obtained much the same as the process described before. However, such a medium also needs the application of a recording bias magnetic field for recording the second magnetic layer. There are thus some difficulties in making the recording apparatus smaller, simpler and cheaper.

Therefore, some media which reduced the recording bias magnetic field or make unnecessary the recording bias magnetic field are proposed in Japanese laid open patent JP-A-1-241051, JP-4-192138 and JP-A-3-156751. In JP-A-1-241051, a recording medium using the demagnetizing field of the second magnetic layer (writing layer) without application of a external bias field is shown.

In JP-A-3-156751, a recording medium using the leaky magnetic field of the fourth magnetic layer (initializing layer) without application of an external bias field is shown. In JP-4-192138, a medium having a fifth magnetic layer having no exchange coupling with the fourth magnetic layer, and a recording method using the leaky magnetic field from the fifth magnetic layer without an external bias magnetic field is shown.

However, in magnetooptic recording, some media described above which reduce the necessary external recording bias magnetic field or make unnecessary the external recording bias magnetic field have the following problems:

In a recording medium using the opposing demagnetizing field of the second magnetic layer (writing layer) without application of an external bias field as described in JP-A-1-241051, it is necessary to change the composition of the writing layer substantially from the compensation composition, and to obtain a composition which shows a large value of saturation magnetization. But, if a material of such composition is chosen for the writing layer, the shapes of the domains which are formed fall into disorder, or multi-domains occur and there is a problem of not getting a good reproducing characteristic.

In a recording method using the leaky magnetic field from the fifth magnetic layer which is formed as a bias layer without an external bias magnetic field as described in JP-A-4-192138, if some domains are formed in the fifth magnetic layer during the laser irradiation used in recording, repeated overwriting brings about random domains and the fifth layer does not function as a bias layer. Therefore, making the Curie temperature of the fifth magnetic layer higher than that of the second magnetic layer, and not making the magnetization of the fifth magnetic layer reverse as a result of the laser irradiation used in recording is necessary. But, during the recording period, the irradiated part of the fifth magnetic layer remains magnetic. In this case if the direction of magnetization of the laser irradiated part is the same as that of magnetization of the peripheral region of the laser irradiated part, the leaky magnetic field from the peripheral region and the leaky magnetic field from the laser irradiated part oppose each other, and a large leaky magnetic field is not generated as shown in FIG. 1.

Therefore, to make the direction of magnetization of the laser irradiated part and that of magnetization of the peripheral region oppose each other, the compensation temperature of the fifth magnetic layer is adjusted in the vicinity of the Curie temperature of the writing layer. Then the temperature at the centre of the laser irradiated part becomes higher than the compensation temperature of the fifth magnetic layer during the recording period, and the magnetization of the laser irradiated part and its peripheral region which oppose each other, generate a leaky magnetic field from the peripheral region and a leaky magnetic field from the laser irradiated part which reinforce each other.

However, to provide the compensation temperature as described above, the saturation magnetization of the fifth magnetic layer at room temperature cannot have a large value. Using rare earth-transition metal magnetic films, the greater the composition of rare earth is than the compensation composition, the higher the compensation temperature is above room temperature, and at the same time the larger the saturation magnetization at room temperature. If the saturation magnetization becomes larger than a certain value, the compensation temperature exceeds the Curie temperature, the compensation temperature is ineffective. Therefore, in this medium a large leaky magnetic field is not generated from the peripheral region and the laser irradiated part as can be seen in FIG. 2.

In a recording method using the leaky magnetic field of the fourth magnetic layer (initializing layer) without an external bias magnetic field as shown in JP-A-3-156751 and so on, effectively large leaky magnetic fields cannot be generated as described above because the Curie temperature of the fourth magnetic layer is higher than that of the second magnetic layer (writing layer). Accordingly, one example showed that a leaky magnetic field was enlarged owing to an initializing layer having a thickness thicker than 80 nm. In this case, there was a problem of decrease of recording sensitivity.

SUMMARY OF THE INVENTION

An object of this invention is to provide a magnetooptical recording medium capable of being overwritten which does not involve a deterioration of quality of reproduction signal and recording sensitivity and which either reduces the necessary strength of the external recording bias magnetic field or does not need it, so it is possible to make the recording and/or reproducing apparatus smaller, simpler and cheaper.

According to the present invention there is provided a magnetooptical recording medium capable of being overwritten by light modulation comprising a stack of magnetic layers wherein the relative Curie temperatures of the bias layer and the writing layer are chosen such that at the higher writing temperature the leaky magnetic field in the bias layer is effective to a least partially reverse the magnetization in the writing layer.

BRIEF DESCRIPTION OF THE DRAWINGS

A number of embodiments of the invention will now be described, by way of example only, the reference to the accompanying drawings in which.

DESCRIPTION OF THE PREFERRED EMBODIMENTS

Figure 1:
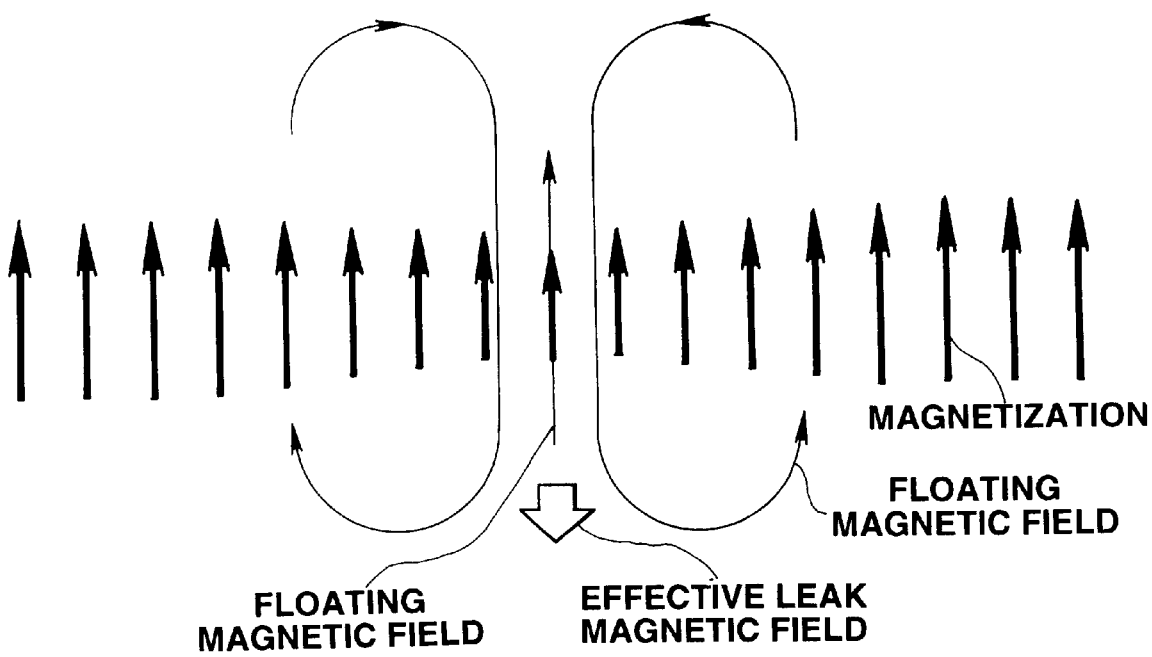
FIG. 1 is a schematic illustration showing the floating magnetic field of the bias layer which is generated in a peripheral region of a laser irradiated part of a prior art magnetooptical recording medium.
Figure 2:
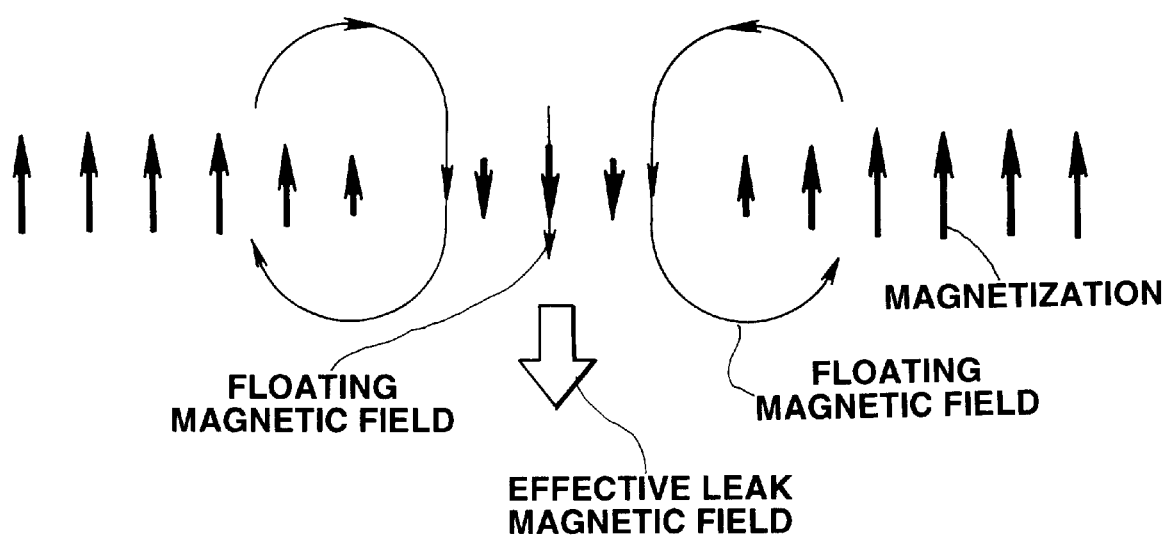
FIG. 2 is a schematic illustration showing the floating magnetic field of the bias layer generated in a peripheral region of a laser irradiated part of a prior art magnetooptical recording medium.
Figure 3:
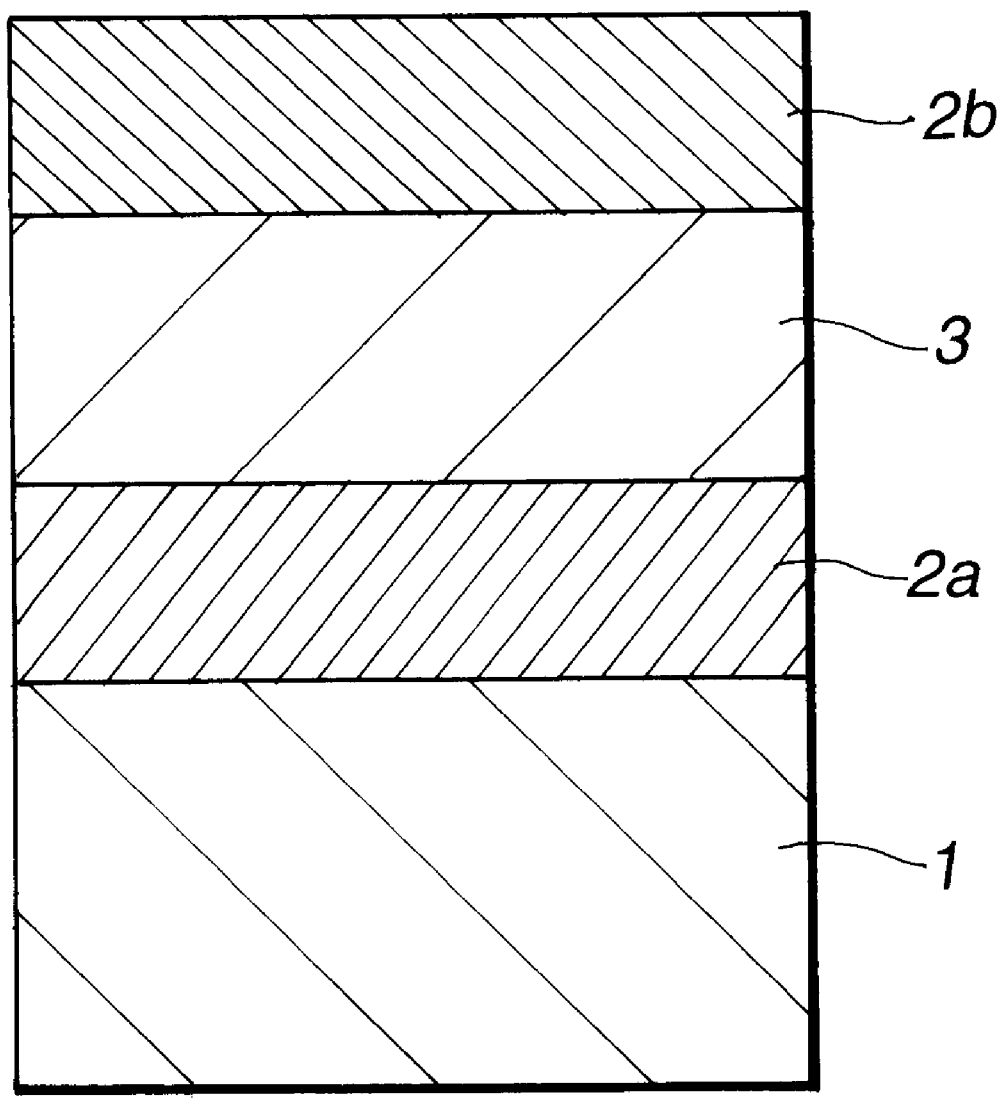
FIG. 3 is a cross sectional view of a magnetooptical recording medium in accordance with a embodiment of the invention.

Referring firstly to FIG. 3, this figure shows a cross sectional view of a magnetooptical recording medium structure in accordance with an embodiment of this invention. A stack of magnetic laminated films 3 is formed over a transparent substrate 1, which comprises for example polycarbonate or glass, with a dielectric layer 2a interposed between the substrate 1 and stack 3, and finally a dielectric layer 2b formed as a protective layer over the stack 3.

Figure 4:
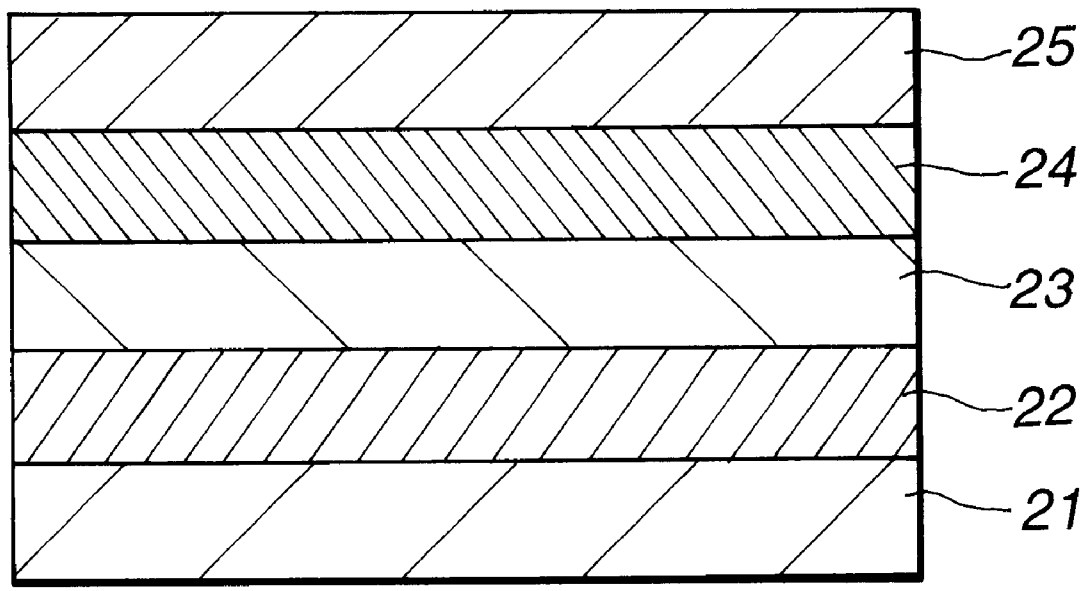
FIG. 4 is a cross sectional view of the magnetic laminated films structure incorporated in the optical magnetic recording medium of FIG. 3.

FIG. 4 is a cross sectional view of the stack 3 of magnetic laminated films of FIG. 3. Starting from the substrate 1 side, the first magnetic 21 layer is a memory layer 21 capable of storing information bits. The second magnetic layer 22 is a writing layer in which information bits can be written during a recording period by application of laser radiation effective to heat the medium to a chosen temperature level. The third magnetic layer 23 is a switching layer which switches on or off the exchange coupling between the second magnetic layer 22 and the fourth magnetic layer 24. The fourth magnetic layer is an initializing layer having a magnetization which is arranged in a direction for initializing the second magnetic layer 22. The fifth magnetic layer is a bias layer for applying a bias magnetic field to the second magnetic layer 22 during the recording period when the medium is heated to the chosen temperature level. The layers 21–25 of the stack 3 are laminated in turn.

Figure 5:
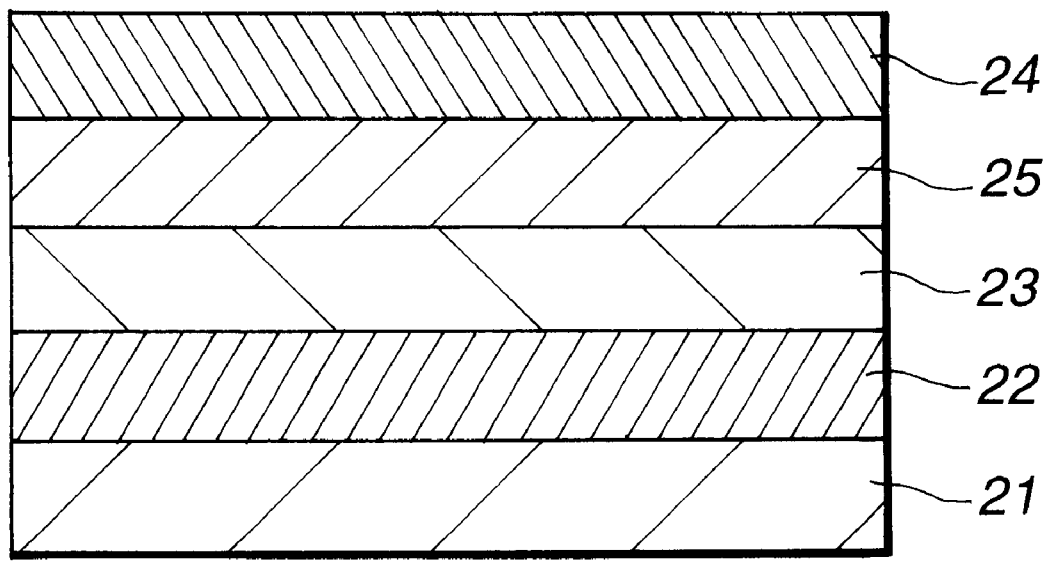
FIG. 5 is a cross sectional view of an alterative magnetic laminated film structure incorporated in the recording medium of FIG. 3.

It is desirable that the fifth layer 25 and the fourth layer 24 be laminated to contact each other, although the fifth layer 25 and the fourth layer 24 can be laminated in reverse order to that shown in FIG. 4 as shown in FIG. 5.

The first magnetic layer 21 satisfies the following conditions at room temperature.

Namely:

$$2 Ms_1 Hc_1 h_1 > \sigma w_{12}$$

where:

$Hc_1$ is the coercive force of the first magnetic layer;

$\sigma w_{12}$ is the interface wall energy between the first magnetic layer 21 and the second magnetic layer 22;

$Ms_1$ is the saturation magnetization of the first magnetic layer 21; and $h_1$ is the film thickness of the first magnetic layer 21.

The first magnetic layer 21 satisfies the following condition near the Curie temperature $T_1$ of the first magnetic layer 21;

$$2 Ms_1 Hc_1 h_1 < \sigma w_{12}$$

The second magnetic layer 22 satisfies the following conditions lower than the Curie temperature $T_3$ of the third magnetic layer:

$$2 Ms_2 Hc_2 h_2 < \sigma w_{24} - \sigma w_{12}$$

where:

$Ms_2$ is the saturation magnetization of the second magnetic layer 22;

$Hc_2$ is the coercive force of the second magnetic layer 22;

$h_2$ is the film thickness of the second magnetic layer 22; and $\sigma w_{24}$ is the interface wall energy between the second magnetic layer 22 and the fourth magnetic layer 24.

The fourth magnetic layer 24 satisfies the following conditions at the temperature between the Curie temperature $T_2$ of the second magnetic layer 22 and room temperature:

$$2 Ms_4 Hc_4 h_4 > \sigma w_{24}$$

where:

$Ms_4$ is the saturation magnetization of the fourth magnetic layer 24;

$Hc_4$ is the coercive force of the fourth magnetic layer 24; and $h_4$ is the film thickness of the fourth magnetic layer 24.

The fifth magnetic layer 25 satisfies the following condition near the Curie temperature $T_5$ of the fifth magnetic layer 25:

$$2 Ms_5 Hc_5 h_5 < \sigma w_{45}$$

where:

$Ms_5$ is the saturation magnetization of the fifth magnetic layer 25;

$Hc_5$ is the coercive force of the fifth magnetic layer 25;

$h_5$ is the film thickness of the fifth magnetic layer, and and $\sigma w_{45}$ is the interface domain wall energy between the fourth magnetic layer 24 and the fifth magnetic layer 25.

Other detailed conditions of the first magnetic layer, the second magnetic layer, the third magnetic layer and the fourth magnetic layer are equivalent to the media shown in the prior art, Japanese laid-open patent JP-A-63-268103, JP-A-3-219449 and WO 90/02400, the contents of which are incorporated herein by reference. As these conditions do not relate to the point of this invention, they are omitted here.

In addition to the above mentioned five layers, an intermediate layer (to be described later) for controlling the interface domain wall energy or other adjusting layer etc can be formed. But, as the fifth layer 25 and the fourth layer 24 need to be laminated to contact each other, it is not desirable to form such intermediate layers between the fifth and fourth layers.

If the Curie temperatures of the first magnetic layer 21 to the fourth layer 24 of the stack of magnetic laminated films are defined as $T_1$ to $T_4$ respectively, the relationship: room temperature$<T_3<T_1<T_2<T_4$ is required.

The Curie temperature $T_5$ of the fifth magnetic layer 25 is needed to be substantially equal to or less than $T_2$.

The Curie temperature $T_5$ is preferably in the range from $T_2-90°$ to $T_2+5°$, more preferably from $T_2-40°$ to $T_2$ °C., more preferably from $T_2-20°$ to $T_2$ °C.

The level of the saturation magnetization of the fifth magnetic layer 25 needs to be larger than that of the second magnetic layer 22. The level of the saturation magnetization is preferably not less than 350 emu/cc at the room temperature, more preferably not less than 450 emu/cc, and even more preferably not less than 600 emu/cc.

The layers of magnetooptical recording medium are formed for example by continuous sputtering using a magnetron sputtering apparatus or continuous evaporation. In particular, each magnetic layer which constitutes the stack of magnetic laminated layers 3 is preferably continuously formed without breaking into the vacuum to make the layers exchange couple to each other.

As the dielectric layer 2a, transparent dielectric materials such as for example $Si_3N_4$, AlN, $SiO_2$, ZnS, $MgF_2$ may be used.

Each magnetic layer within the stack 3 of the magnetic laminated layers preferably comprises a rare earth-transition metal magnetic film. As the rare earth-transition metal magnetic film, for example rare earth-iron group amorphous metal alloy composed of 5 to 50 at % (atomic %) of one or more kinds of rare earth metal elements, i.e. Pr, Nd, Sm, Gd, Tb, Dy, Ho and so on, and 95 to 50 at % of one or more kinds of iron group metal elements may be used. In order to improve corrosion resistance and so on, a small quantity of Cr, Mn, Cu, Ti, Al, Si, Pt, In and so on can be added.

The saturation magnetization of each magnetic layer within the stack 3 can be controlled by controlling the composition ratio of the rare earth and transition metal elements.

The coercive force of each magnetic layer in the stack of magnetic laminated films 3 can be controlled by the saturation magnetization, but primarily it can be controlled by adjustment of the vertical magnetic anisotropy. The vertical magnetic anisotropy can be controlled by selecting the elements within each magnetic layer. Generally, the materials of the TbDy group and so on have large vertical magnetic anisotropy and large coercive force. But the materials of the Gd group have small vertical magnetic anisotropy and small coercive force. A nonmagnetic element can be added to reduce the vertical magnetic anisotropy.

The Curie temperature of each magnetic layer within the stack 3 can also be controlled by controlling the composition ratio of rare earth and transition metal elements. However, in order to control the Curie temperature independently of the saturation magnetization, substitution of Co for Fe as the transition metal element is preferable. In particular, substitution of Co for 1 at % of Fe produces an almost 6° C. rise of the Curie temperature. Using this relation it is possible to obtain an adequate Curie temperature by adjusting the quantity of Co added.

On the other hand, it is also possible to reduce the Curie temperature by adding a small amount of nonmagnetic element such as Cr, Ti and so on. Also it is possible to adjust the Curie temperature by adjusting the composition of two or more kinds of rare earth element.

In order to control the interface wall energy of the magnetic laminated films, it is possible to adjust the time periods for which each layer is left before deposition of the subsequent layer, or to irradiate the layers with active gases. Alternatively, a nonmagnetic or magnetic intermediate layer may be inserted in some interfaces between the layers of the stack 3. Magnetic intermediate layers having relatively small vertical magnetic anisotropy are superior in respect of manufacturing stability and so on.

The thickness of each layer can be controlled by adjusting the deposition time.

A magnetooptical recording medium in accordance with this invention is not restricted to the above mentioned structure. For example, in order to improve the quality of the reproduction signals further, it is possible to add a magnetic layer which has a high Curie temperature on the first magnetic layer 21 (memory layer) as a reproduction layer. It is also possible to add a layer which has another function, and to make a plurality of layers constitute each layer. It is possible to protect both sides of the magnetic layer with a dielectric layer, and to add a metal layer directly on or with an interposed thermal buffer layer in order to adjust the thermal functioning of the medium. A magnetooptical recording medium in accordance with this invention may include all such variations.

The effect of the fifth magnetic layer 25 which acts as a bias layer in a magnetooptical recording medium in accordance with an embodiment of this invention is explained as follows.

Figure 6:
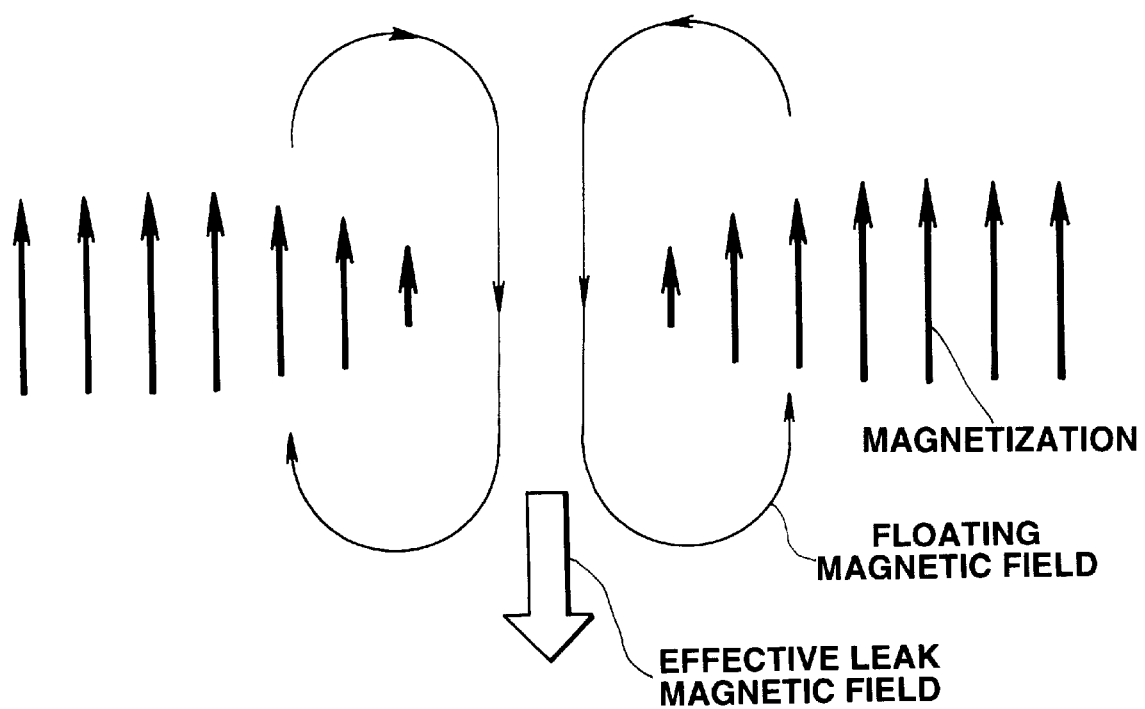
FIG. 6 is a schematic illustration showing the floating magnetic field of the bias layer which is generated in a peripheral region of the laser irradiated part of the magnetooptical recording medium of FIG. 3.

As can be seen from FIG. 6, in a medium in accordance with an embodiment of this invention, a leaky magnetic field can be effectively generated without opposing the floating magnetic field from the peripheral region of the irradiated portion of the medium, because there is no remaining magnetism in the laser irradiated part of the fifth magnetic layer 25 during the high temperature level recording as the Curie temperature $T_5$ of the bias layer 25 is exceeded.

In accordance with the embodiment of the invention, it is possible to increase the saturation magnetization of the fifth layer 25 without disturbing the shape of the domain to be formed, or without forming micro-domains, because the fifth layer is not exchange coupled with the second magnetic layer 22 which acts as a writing layer at a temperature over the Curie temperature of the third magnetic layer 23. So, in accordance with this invention it is possible to generate a large floating magnetic field from the peripheral region as shown in FIG. 6.

Furthermore, as the fifth magnetic layer 25 is exchange coupled with the fourth magnetic layer, i.e. the initializing layer 24, which as a Curie temperature $T_4$ which is higher than that of the second magnetic layer 22, there is no formation of domains in the fifth layer 25 by laser irradiation during the recording period.

With regard to optical magnetic recording and/or reproducing apparatus for use with the above embodiment of a medium in accordance with this invention, adaptations of known magnetooptical recording and/or reproducing apparatus can be used with an appropriate laser driving circuit for selecting the two different laser powers effective to heat the medium to TL and TH respectively. The recording bias magnetic field generating means in prior art apparatus may be omitted if the magnetooptical recording medium of this invention may be made capable of recording without bias magnetic field. However, where the medium only enables a decrease in bias magnetic field, the recording bias magnetic field generating means cannot be omitted.

Figure 7:
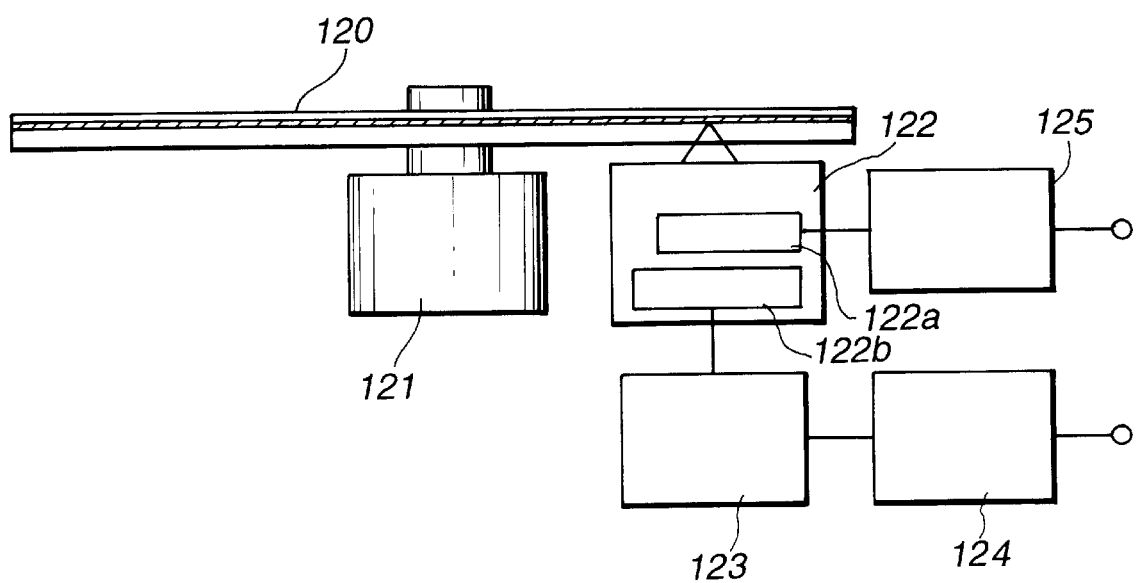
FIG. 7 is a schematic illustration showing a recording and/or reproducing apparatus used in an embodiment of this invention.

A suitable magnetooptical recording and/or reproducing apparatus for use with a medium in accordance with an embodiment of the present invention is shown schematically in FIG. 7.

It will be appreciated that such an apparatus may be designed to either record information only, or to record information and subsequently reproduce the recorded information. In FIG. 7, 120 denotes a magnetooptical recording medium in accordance with an embodiment of this invention. 121 denotes a spindle motor which rotates the medium 120. 122 is an optical head on which an optical system including components such as a photo sensor 122a, a laser source 122b, polarisers (not shown) and so on are mounted. 123 is a laser driving circuit which drives said laser source to emit radiation at a required power. 124 is a modulation circuit which modulates recording data using a desired modulation method and outputs modulated recording data to the laser driving circuit. 125 is a reproducing circuit which produces reproduced data from the output of the photo sensor 122a.

An information recording and a reproducing process using a magnetooptical recording medium in accordance with an embodiment of the invention will now be explained.

Figure 8:
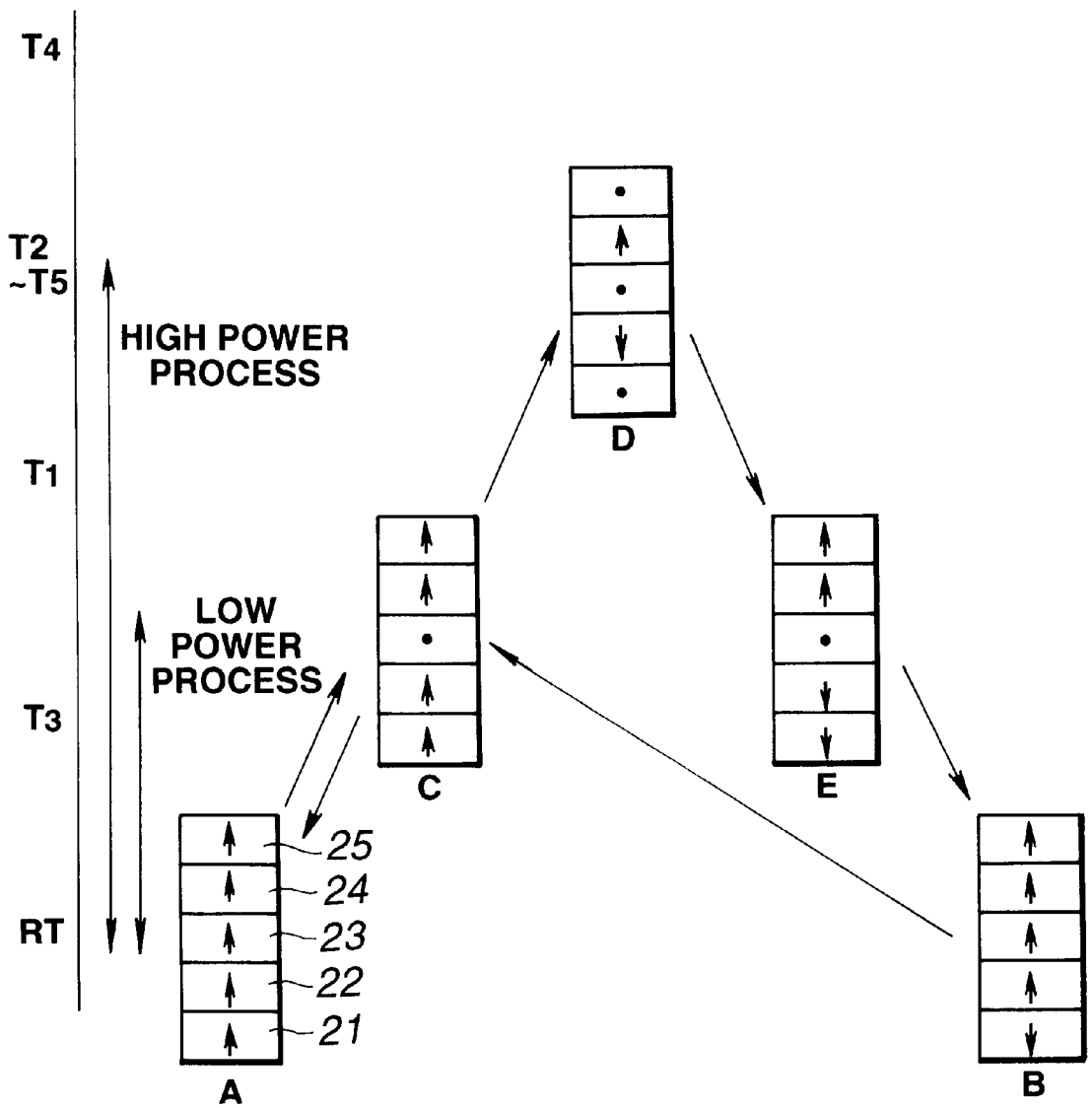
FIG. 8 is a schematic illustration showing the various magnetization states of the medium of FIGS. 3 and 4 during a recording process in accordance with an embodiment of this invention.

Referring to FIGS. 7 and 8, the recording data modulated by the modulating circuit is output to the laser driving circuit 123. Dependent on the modulated recording data, the laser driving circuit 123 drives the laser source 122b to produce laser radiation intensity modulated to one of the two above mentioned powers PH and PL which are effective to heat the irradiated part of the medium to one of the two recording temperatures TH and TL. For example, when the data is represented by "1" the laser power is modulated to PH. When the data is represented by "0" the laser power is modulated to PL.

When the laser produces radiation of power PH to irradiate a portion of the medium as shown in FIG. 8, regardless of the state of magnetization of the first magnetic layer before the recording, state B is finally obtained. When the laser is used to produce radiation of power PL to irradiate the portion of the medium, regardless of state of magnetization of the first magnetic layer before the recording, state A is finally obtained.

This can be explained as follows. The explanation will be given assuming that the state of magnetization of the layers before the recording procedure is initially state B, but the procedure where the layers are initially in state B is similar.

When the laser of power PH is used to irradiate the medium in state A in which the direct of magnetization of all the magnetic layers follows the direction of the fourth magnetic layer 24, i.e. the initializing layer 24, the magnetic state of the irradiated part of the medium passes through state C and becomes state D. In this state D, the magnetization of the first magnetic layer 21, the third magnetic layer 23 and the fifth magnetic layer 25 disappears because the temperature of the irradiated portion of the medium exceeds the Curie temperature $T_1$, $T_3$ of the first and third layers 21, 23 and slightly exceeds the Curie temperature $T_5$ of the fifth magnetic layer 25. The magnetization of the second magnetic layer 22 is easily reversed by the leaky magnetic field of the fifth magnetic layer 25 in the area of the magnetic recording medium peripheral to the irradiated part of the medium (i.e. peripheral to the recording domain), because the exchange coupling of the second magnetic layer 22 with other the layers is cut off.

After the end of the laser irradiation, the irradiated part of the medium cools down, and when the temperature becomes lower than the Curie temperature $T_1$ of the first magnetic layer 21, the magnetization of the first layer 21 reappears, this reappearing magnetization followed by the exchange coupling in the direction parallel to the direction of the magnetization of the second magnetic layer 22.

As the temperature further reduces, the magnetization of the third magnetic layer 23 reappears. The magnetization of the third magnetic layer 23 is oriented in the direction parallel to the direction of the magnetization of the fourth magnetic layer 24 by the influence of the exchange coupling from the fourth magnetic layer 24 which has a large coercive force.

When the temperature of the medium cools down to the room temperature RT, the magnetization of the second magnetic layer 22 under the influence of the exchange coupling from the fourth magnetic layer 24 with the interposed third magnetic layer 23 is oriented in the direction parallel to the direction of the magnetization of the fourth magnetic layer 24. As the coercive force of the first magnetic layer 21 returns to the room temperature value, this coercive force prevents the magnetization of the first magnetic layer 21 from orienting to the direction parallel to the direction of the magnetization of the second magnetic layer 22 due to the influence of the exchange coupling from the second magnetic layer 22. As a result, the magnetization state B is obtained in which the magnetization state of the memory layer 21 is opposite to that of the other layers 22, 23, 24, 25 in the stack 3.

When the laser emits radiation of power PL for irradiating the medium whilst in the initial state A, the magnetic state of the irradiated part of the medium becomes state C. In this state C, the magnetization of the third magnetic layer 23 disappears, because the temperature reaches the Curie temperature $T_3$ of the third magnetic layer 23 of the irradiated portion of the medium.

The magnetization of the first magnetic layer 21 becomes oriented in a direction parallel to the direction of the magnetization of the second magnetic layer 22 by the influence of the exchange coupling from the second magnetic layer 22 as the coercive force of the first magnetic layer 21 decreases. After the end of the laser irradiation at power PL, the laser irradiated part of the medium cools, and finally state A is obtained.

It will be seen that even if the recording domain is originally in state B, heating the medium to the temperature TL by application of a laser power PL will result in state A being attained on cooling of the recording domain to room temperature RT.

As explained above, the required two valued recording is executed by forming either state A or state B on the medium according to the recording data by application of either high power (PH) or low power (PL) laser pulses.

The way in which reproduction of the recorded data takes place, which was recorded in the above mentioned way, may be explained as follows:

An irradiating laser of sufficiently low power so as not to erase data on the medium is directed onto the medium and the reflected light from the medium detected with the photo sensor 122a via appropriate polarizers (not shown).

The amount of received light on the photo sensor 122a, changes according to the direction of the magnetization at the irradiated portion of the medium due to the change in polarization produced by the magnetic Kerr effect. Based on these changes in received light intensity, recorded data is reproduced by the reproducing circuit 125.

Embodiments of the present invention will be described in more detail by reference to specific examples. However the present invention is not restricted to these examples.

EXAMPLE 1

Dy, Tb, Fe, Co, Al and B doped Si targets were installed in a DC magnetron sputtering apparatus (not shown). A polycarbonate disc substrate was fixed on the substrate holder, then the chamber of the apparatus was exhausted to a high vacuum level of $1\times10^{-5}$ Pa or less using a cryopump.

Ar gas was introduced into the exhausted chamber to obtain 0.3 Pa vacuum level in the chamber. The substrate was rotated. A 80 nm layer of SiN was deposited.

Each magnetic layer 21 to 25 was formed by applying DC power to each Dy, Tb, Fe, Co target, the composition of each magnetic layer being controlled by adjustment of the DC power.

After the formation of the first magnetic layer 21, the first magnetic layer was retained in the vacuum chamber for 30 minutes and then the second magnetic layer 22 was formed. After the second magnetic layer, each of the remaining magnetic layers were formed in turn. By this means the exchange coupling force at the interface between the first magnetic layer 21 and the second magnetic layer 22 and interface wall energy was reduced and controlled to almost 1 erg/cm$^2$.

In turn, a 20 nm layer of TbFeCo as the first magnetic layer 21, a 20 nm layer of DyFeCo as the second magnetic layer 22, a 5 nm layer of TbFe as the third magnetic layer, a 20 nm layer of TbCo as the fourth magnetic layer 24, and a 20 nm layer of TbFeCo as the fifth magnetic layer 25 were deposited. Finally, a 50 nm layer of Al was deposited.

The composition of the fifth layer was adjusted to obtain a value of saturation magnetization of almost 600 emu/cc at room temperature. The relative composition of rare earth and iron group element in each magnetic layer, except the fifth layer 25, was adjusted in order to obtain a composition such that the saturation magnetization at room temperature for each layer 21–24 was in the order of 0 emu/cc, i.e. in the vicinity of compensation composition.

The amount of Co in the first magnetic layer 21, the second magnetic layer 22 and the fifth magnetic layer 25, was adjusted to obtain Curie temperatures of respectively 145° C., 250° C. and 240° C. The Curie temperature of the third magnetic layer was 125° C. and the Curie temperature of the fourth magnetic layer was higher than 300° C.

In order to form the SiN layer 26, $N_2$ gas was introduced in the chamber in addition to the Ar gas, and the SiN layer was formed using a reactive sputtering method.

The magnetooptical recording medium obtained by the above mentioned process was set on a drive apparatus having a optical head including a laser of wavelength 780 nm, and an object lens of NA0.055. Rotating the medium with a fixed cycle of 60 Hz, a measurement was performed at the 24 mm radial position. Before the measurement, the whole periphery of the disc was erased by high output laser irradiation, and the fourth magnetic layer 24, i.e. the initializing layer was magnetized in a direction normal to the layers 21 to 25.

Figure 9:
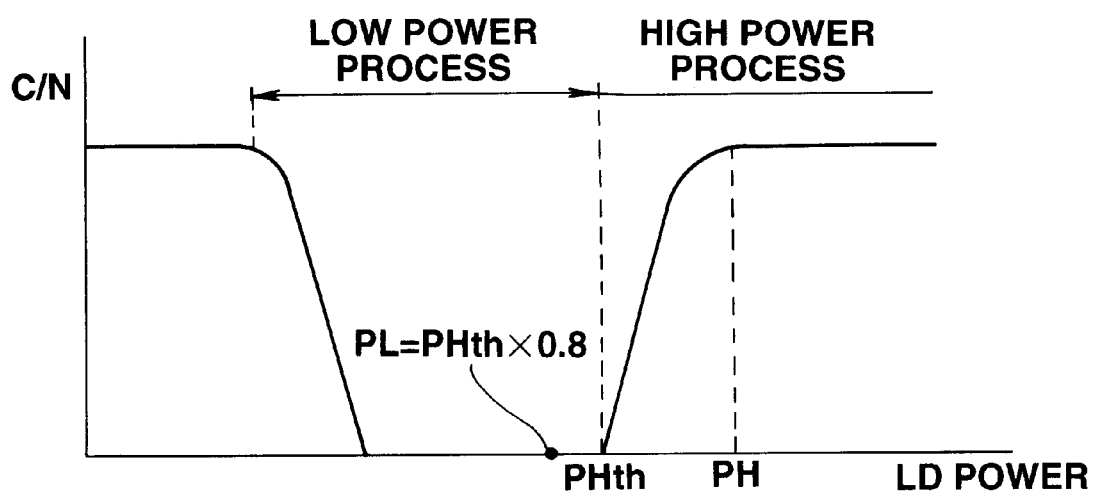
FIG. 9 is a graph showing the relation between PH and PL the radiation powers of the radiation emitted by the laser incorporated in the apparatus of FIG. 7.

Referring now to FIG. 9, firstly, in order to measure the power $PH_{th}$ which is the maximum power cable of being applied as a pedestal power, the power level of the irradiating laser at which the recording of 1 MHz signals at a 50% duty cycle may be produced was detected with an applied recording bias magnetic field of 300 Oe. As a result, the power $PH_{th}$ was found to be 5.0 mW. Arranging PL to be 4.0 mW, which is 0.8 times $PH_{th}$, and fixing the pulse width as 57n sec, the pulse power PH at which the CN ratio was saturated was measured by recording a 5.8 MHz signal. As a result, the power PH was found to be 8.5 mW.

Figure 10:
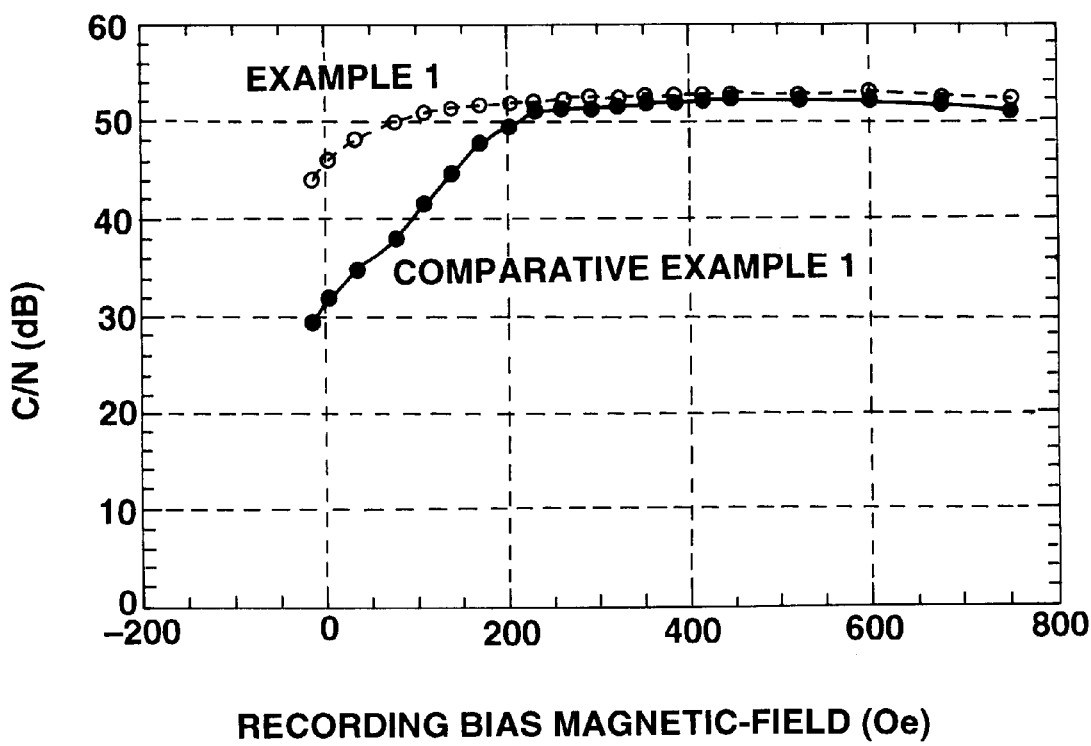
FIG. 10 is a graph showing the dependency of the CN ratio on the recording bias magnetic field for the magnetooptical recording media of Example 1 and of Comparative Example 1.

Based on these measurements, the pulse power PH was arranged to be 8.5 mW, the pulse power PL was arranged to be 4.0 mW and 2.2 MHz signals were initially recorded. 5.8 MHz signals were then overwritten over the 2.2 MHz signals by changing the recording bias magnetic field. The dependency of the CN ratio on the recording bias magnetic field is shown in FIG. 10.

COMPARATIVE EXAMPLE 1

Figure 11:
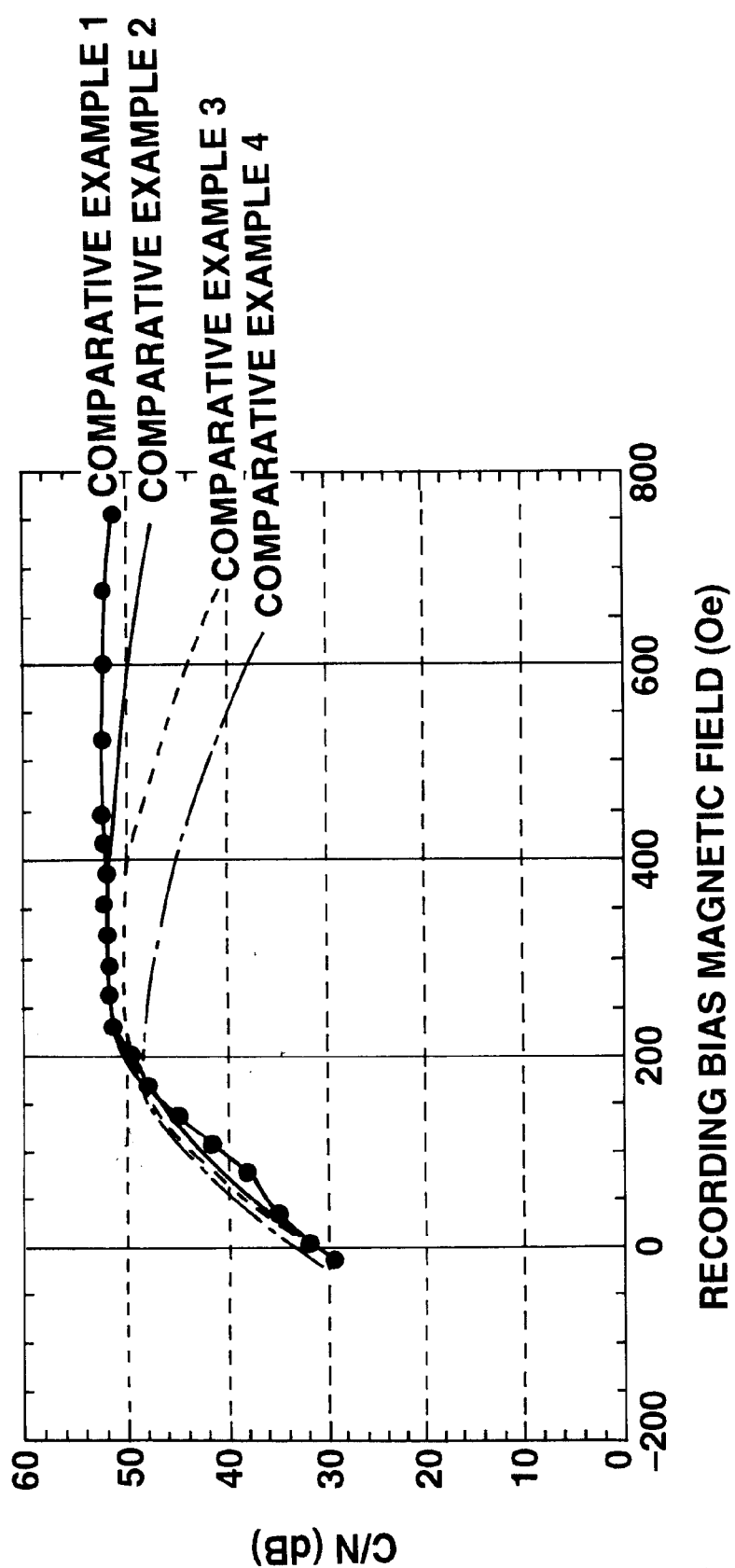
FIG. 11 is a graph showing the dependency of the CN ratio on the recording bias magnetic field for the magnetooptical recording medium of Comparative Examples 1 to 4.

A comparative magnetooptical recording medium was prepared in the same way as the Example 1, except that in fifth magnetic layer was not formed. The result of the C/N measurement on the recording medium, which was performed in the same way as for Example 1 is shown in FIGS. 10 and 11.

As to the overwriting characteristic, in Example 1 and Comparative Example 1, good characteristics were obtained without observation of the initially recorded signal spectrum. However, in the Comparative Example 1, a recording bias magnetic field of 160 Oe was needed in order to obtain a CN ratio of 47 dB which is needed for digital recording.

In Example 1, as shown in FIG. 10, a recording bias magnetic field of 20 Oe was sufficient.

In view of this result, it was proved that the fifth magnetic layer 25 functioned as a bias layer, a leaky magnetic field which corresponded to 140 Oe was generated in the recording time and the necessary external recording bias magnetic field was reduced.

COMPARATIVE EXAMPLES 2, 3 AND 4

The second, third and fourth Comparative Examples of magnetooptical recording media were formed in the same was as Example 1, except that the fifth magnetic layer was not formed, the composition of the second magnetic layer 22 was shifted to the iron group element rich side, and the saturation magnetization of the second magnetic layer at room temperature was adjusted to 150 emu/cc in Comparative Example 2, 250 emu/cc in Comparative Example 3, and 350 emu/cc in Comparative Example 4 in order to increase the demagnetizing field of the writing layer 22. The result of the measurements on the recording media, which were performed the same way on the Example 1, are shown in FIG. 11.

As shown in FIG. 11, though the demagnetizing field of the writing layer 22 was increased, the characteristic at the lower recording bias magnetic field values does not improve as much. On the contrary, the characteristic at the higher values of the recording bias magnetic field deeply declines as does the peak CN ratio.

COMPARATIVE EXAMPLE 5

The Comparative Example 5 of a magnetooptical recording medium was formed in the same way as Example 1, except for not forming the fifth magnetic layer. Also, the composition of the fourth magnetic layer 24 was shifted to the iron group element rich side, the saturation magnetization of the fourth magnetic layer 24 at room temperature was adjusted to 200 emu/cc, the thickness of the fourth magnetic layer 24 was 80 nm, and the initializing layer 24 also acted as a bias layer. The recording sensitivity of the magnetooptical recording medium was measured in the same way as Example 1.

$PH_{th}$ was found to be 6.8 mV, using a value of PL of 5.5 mW (which was 0.8 times $PH_{th}$), the pulse power PH at which the CN ratio was saturated was found to be 12.3 mW using a 5.8 MHz recording signal.

EXAMPLE 2

The optical magnetic recording medium was prepared in the same way as Example 1, except that between the first magnetic layer 21 and the second magnetic layer 27, a magnetic layer composed of Gd group material was inserted as an adjusting layer to control the interface wall energy between the layers. The fifth magnetic layer 25 which functions as a bias layer was arranged between the third magnetic layer 23 and fourth magnetic layer 24. The magnetic laminated films were arranged as shown in Table 1.

TABLE 1

| | MATERIAL COMPOSITION (at %) | | FILM THICKNESS (nm) | SATURATION MAGNETIZATION (emu/cc) | CURIE TEMPERATURE (° C.) |
|---|---|---|---|---|---|
| | RARE EARTH METAL | TRANSITION METAL | | | |
| INITIALIZING LAYER | Tb 20 | $Fe_{15}Co_{14}Cr_2$ 80 | 20 | −70 | >300 |
| BIAS LAYER | Tb X | $Fe_{(98-y)}Co_{(y)}Cr_2$ 100 − x | 20 | $M_5$ | $T_4$ |

TABLE 1-continued

|  | MATERIAL COMPOSITION (at %) | | FILM THICKNESS (nm) | SATURATION MAGNETIZATION (emu/cc) | CURIE TEMPERATURE (° C.) |
| --- | --- | --- | --- | --- | --- |
|  | RARE EARTH METAL | TRANSITION METAL | | | |
| SWITCHING LAYER | Tb 20 | $Fe_{35}Co_2Cr_2$ 80 | 10 | −50 | 135 |
| WRITING LAYER | Tb 18 | $Fe_{82}Co_{34}Cr_2$ 82 | 15 | −150 | 250 |
| ADJUSTING LAYER | Gd 30 | $Fe_{45}Co_{15}Cr_2$ 70 | 20 | +350 | 180 |
| MEMORY LAYER | Tb 20 | $Fe_{98}Co_4Cr_2$ 80 | 25 | −80 | 150 |

The saturation magnetization of the optical magnetic recording medium given in Table 1 means the value at room temperature. In Table 1, in the column giving saturation magnetization values, a symbol "−" means that the iron group element sub lattice magnetization is dominant at room temperature, and the symbol "+" means that the rare earth element sub lattice magnetization is dominant at room temperature.

In the magnetooptical media of this example, in the fifth magnetic layer 25 (bias layer), the composition ratio (x) of Tb was adjusted to be in the range of from 9 to 17 at %, whilst the ratio (y) of Co was adjusted in the range of from 5 to 16 at %. The Curie temperature ($T_5$) of the fifth magnetic layer 25 was fixed at 220° C., and the saturation magnetization ($M_5$) was changed to be in the range of from −200 to −700 emu/cc. Ten kinds of magnetooptical recording media were obtained, and the saturation magnetization ($M_5$) was fixed at −555 emu/cc. The Curie temperature ($T_5$) was changed in the rate of from 140° C. to 260° C. and then 11 kinds of optical magnetic recording media were obtained.

The CN ratio dependent character on a recording bias magnetic field of each magnetooptical recording medium was measured in the same way as in Example 1, and the minimum recording magnetic field $Hb_{min}$ required to obtain a CN ratio of 47 dB was measured.

Figure 12:
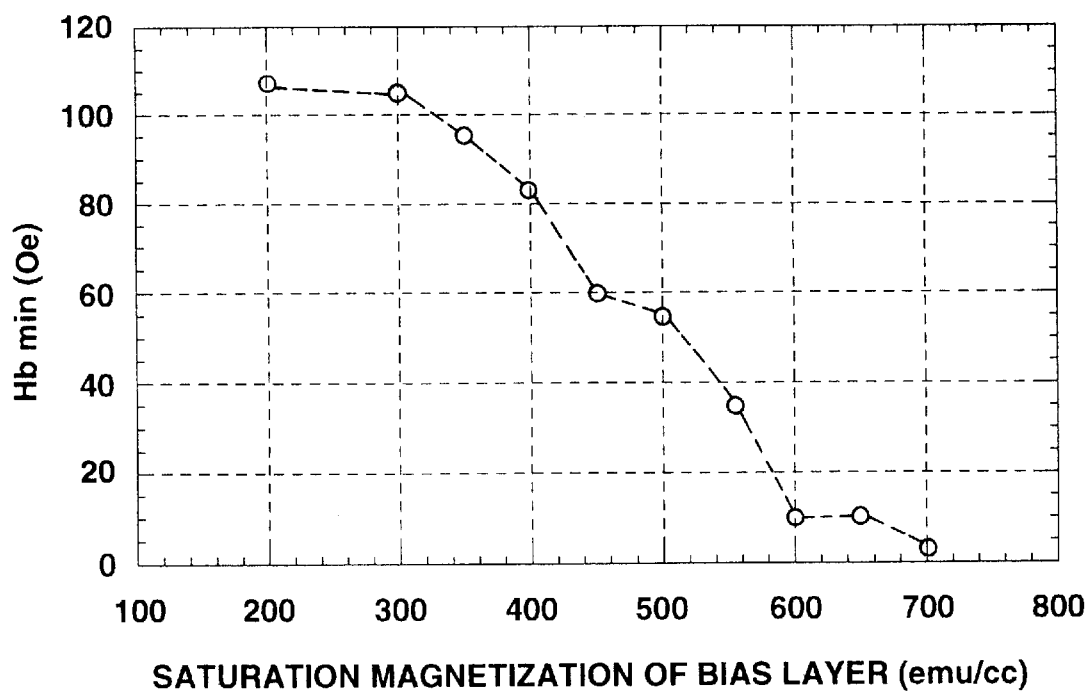
FIG. 12 is a graph showing the dependency of the minimum recording bias magnetic field (Hbmin) on the saturation magnetization of the bias layer at room temperature in an magnetooptical recording medium of an embodiment of this invention for obtaining a CN ratio of 47 dB.
Figure 13:
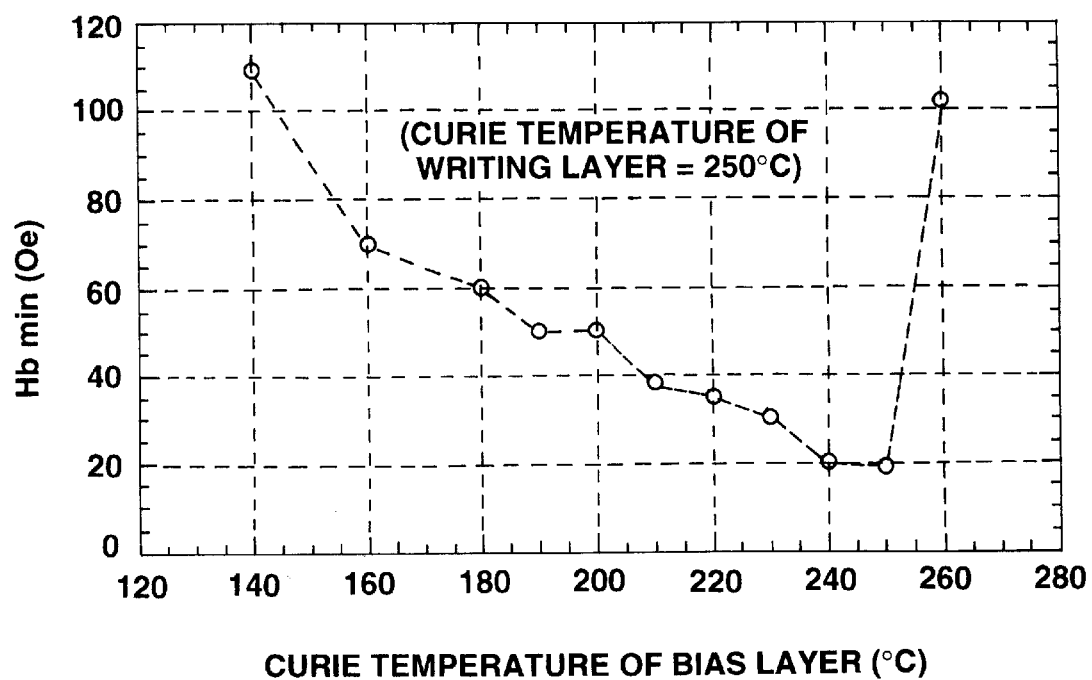
FIG. 13 is a graph showing the dependency of the minimum recording bias magnetic field (Hbmin) on the Curie temperature of the bias layer at room temperature in a magnetooptical medium in accordance with an embodiment of an embodiment of this invention for obtaining a CN ratio of 47 dB.

The dependence of Hbmin on saturation magnetization ($M_5$) is shown in FIG. 12 and its dependence on Curie temperature ($T_5$) is shown in FIG. 13.

In FIG. 12, as the saturation magnetization of the fifth layer 25 increased, the recording bias magnetic field ($Hb_{min}$) decreased, and on or over 350 emu/cc, a steep decrease effect was obtained.

In FIG. 13, an adequate decrease in the minimum recording magnetic field $Hb_{min}$ was obtained in the range of from 160° C. to 255° C. of Curie temperature of the bias layer 25. In comparison, with the Curie temperature ($T_2$) of the second magnetic layer writing layer 22, the range of values of $T_5$ was from ($T_2$−90° C.) to ($T_2$+5° C.).

In the other examples in which the Curie temperature of the second magnetic layer 22 was changed, the same dependency with $Hb_{min}$ was measured in the same way, and the result gave almost the same relationship.

It is thought that if the Curie temperature $T_5$ of the fifth magnetic layer 25 is too low compared to that of the second magnetic layer 22, the peak position along the plane of the film face of the leaky magnetic field strength will shift to outside of the position at which a recording domain was formed by irradiation of the laser beam. If $T_5$ is too high compared to that of the second magnetic layer 22, the peak position in the plane of the film face of the stack 3 of leaky magnetic field strength will shift to the inside of the position of the recording domain. It is thought that if the Curie temperature ($T_5$) of the fifth magnetic layer 25 is too high compared to that of the second magnetic layer 22, there will be a remaining magnetization at the position of the recording domain of the fifth magnetic layer 25, and there will be no generation of an effective leaky magnetic field. Therefore the necessary external recording bias magnetic field will increase immediately.

Also, the reason that the center of adequate temperature range may be located at a lower temperature than the Curie temperature ($T_2$) of the second magnetic layer 22, is thought to be because of the relationship of the above mentioned peak position in the plane of the film face of the leaky magnetic field strength, the position at which a domain was formed, and the temperature incline in the direction of the film thickness.

COMPARATIVE EXAMPLE 6

A magnetooptical recording medium was prepared in the same way as Example 2, except for not forming the fifth magnetic layer. The measurement on the recording medium was performed in the same way as for Example 2. In consequence, the minimum recording bias magnetic field (Hbmin) was measured to be 170 Oe.

EXAMPLE 3

The third example of a magnetooptical recording medium in accordance with the invention was prepared in the same way as for Example 1, except that the magnetic laminated films had the composition and thicknesses shown in Table 2. The dependency of the CN ratio on the recording bias magnetic field of this magnetooptical recording medium was measured in the same way as for Example 1, and the result is shown in FIG. 14.

Figure 14:
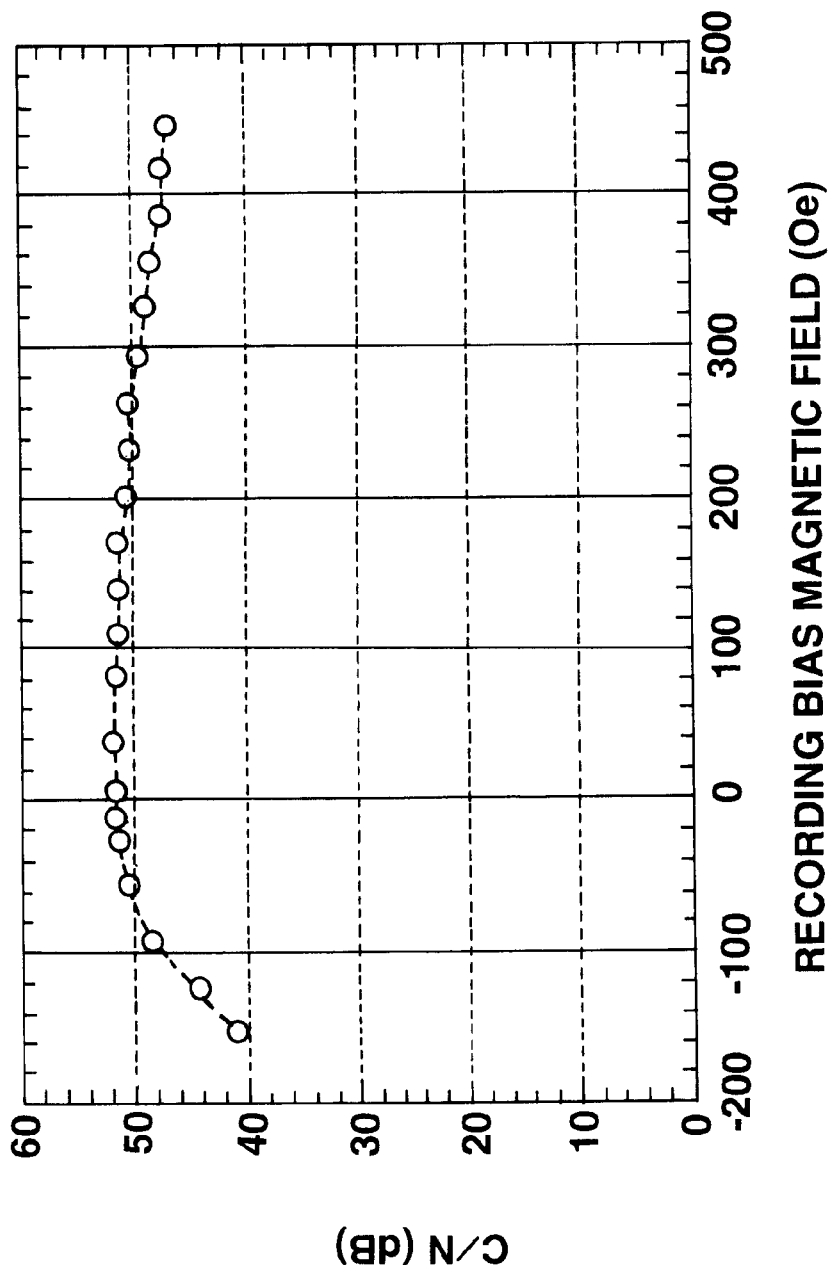
FIG. 14 is a graph showing the dependency of the CN ratio on the recording bias magnetic field for a magnetooptical recording medium in accordance with an embodiment of this invention.

As shown in FIG. 14, a CN ratio of 52 dB was obtained with no external bias recording field, and in a large magnetic field range from −100 to +450 Oe, a CN ratio not less than 47 dB was obtained.

TABLE 2

| | (at %) MATERIAL COMPOSITION | | | | |
|---|---|---|---|---|---|
| | RARE EARTH METAL | TRANSITION METAL | FILM THICKNESS (nm) | SATURATION MAGNETIZATION (emu/cc) | CURIE TEMPERATURE (° C.) |
| BIAS LAYER | Tb 10 | $Fe_{84}Co_{12}Cr_2$ 90 | 30 | −650 | 215 |
| INITIALIZING LAYER | Tb 22 | $Fe_{15}Co_{80}Cr_2$ 78 | 30 | 0 | >300 |
| SWITCHING LAYER | Tb 20 | $Fe_{98}Co_2$ 80 | 10 | −40 | 125 |
| WRITING LAYER | Tb 16 | $Fe_{84}Co_{14}Cr_2$ 84 | 15 | −190 | 245 |
| ADJUSTING LAYER | Cd 24 | $Fe_{98}Cr_2$ 78 | 20 | +110 | 200 |
| MEMORY LAYER | Tb 20 | $Fe_{90}Co_4Cr_2$ 80 | 25 | −80 | 150 |

Based on the above mentioned explanation, it was proved that by this invention, in a magnetooptical recording medium capable of being overwritten by light modulation, by adding a magnetic layer which could generate an effective large leaky magnetic filed, without decline of quality of reproduction signal or recording sensitivity, it is possible to reduce the recording bias magnetic field, or to avoid it completely and therefore make the recording and/or reproducing apparatus smaller, simpler and cheaper.

It will be appreciated that in the foregoing description, the ambient temperature is quoted as room temperature. However, in some recording and/or reproducing apparatus, the ambient temperature may be more or less than room temperature.

What I claim is:

1. A magnetooptical recording medium capable of being overwritten by light modulation comprising a stack of layers comprising:

a writing layer in which information bits can be written;

a bias layer which generates a leaky magnetic field for writing information bits in said writing layer;

a memory layer for storing information bits, wherein the Curie temperature of the writing layer is higher than that of said memory layer;

a switching layer having a Curie temperature which is lower than the Curie temperature of said memory layer and is higher than ambient temperature; and an initializing layer having a Curie temperature which is higher than that of said writing layer and having a magnetization arranged in a predetermined direction, wherein said bias layer has a Curie temperature which is approximately equal to or lower than the Curie temperature of said writing layer and has a larger saturation magnetization than that of said writing layer, and wherein said bias layer is provided between said initializing layer and said switching layer.

2. A magnetooptical recording medium capable of being overwritten by light modulation comprising a stack of layers comprising:

a writing layer in which information bits can be written;

a bias layer which generates a leaky magnetic field for writing information bits in said writing layer;

a memory layer for storing information bits, wherein the Curie temperature of the writing layer is higher than that of said memory layer;

a switching layer having a Curie temperature which is lower than the Curie temperature of said memory layer and is higher than ambient temperature; and an initializing layer having a Curie temperature which is higher than that of said writing layer and having a magnetization arranged in a predetermined direction, wherein said bias layer has a Curie temperature which is approximately equal to or lower than the Curie temperature of said writing layer and has a larger saturation magnetization than that of said writing layer, and wherein said switching layer and said bias layer are provided on opposite sides of said initializing layer.

3. A magnetooptical recording medium according to claims 1 or 2, wherein the value of saturation magnetization of said bias layer at ambient temperature is at least 350 emu/cc.

4. A magnetooptical recording medium according to claims 1 or 2, wherein the Curie temperature of said bias layer is in the range of from ($T_2$−90° C.) to ($T_2$+5° C.) where $T_2$ is the Curie temperature of the writing layer.

5. A magnetooptical recording medium according to claims 1 or 2 in which each said layer comprises a rare earth transition metal alloy.

6. A magnetooptical recording medium according to claims 1 or 2 in which an adjusting layer is inserted between the memory layer and writing layer.

* * * * *

UNITED STATES PATENT AND TRADEMARK OFFICE
CERTIFICATE OF CORRECTION

PATENT NO. : 5,949,743
DATED : September 7, 1999
INVENTOR(S) : TSUTOMU SHIRATORI

It is certified that error appears in the above-identified patent and that said Letters Patent is hereby corrected as shown below:

COLUMN 1

Line 21, "laid open" should read --laid-open--;
    Line 35, "laser" should read --laser,--; and
    Line 47, "filed" should read --field--.

COLUMN 2

Line 18, "recording" should read --recording in--;
    Line 23, "laid open" should read --laid-open--;
    Line 27, "a" should read --an--; and
    Line 65, "case" should read --case--.

COLUMN 3

Line 27, "the" should read --and the--.

COLUMN 4

Line 9, "cross sectional" should read --cross-sectional--;
    Line 12, "cross sectional" should read --cross-sectional--;
    Line 15, "cross sectional" should read --cross-sectional--;
    Line 30, "PL" should read --PL,--;
    Line 44, "in an" should read --in a--;
    Line 49, "medium" should read --recording medium--;
    Line 50, "of an embodiment" should be deleted; and
    Line 60, "cross" should read --cross- --.

UNITED STATES PATENT AND TRADEMARK OFFICE
CERTIFICATE OF CORRECTION

PATENT NO. : 5,949,743

DATED : September 7, 1999

INVENTOR(S) : TSUTOMU SHIRATORI

It is certified that error appears in the above-identified patent and that said Letters Patent is hereby corrected as shown below:

COLUMN 5

Line 1, "cross sectional" should read --cross-sectional--;
Line 3, "21" (second occurrence) should be deleted; and
Line 38, "21;" should read --21:--.

COLUMN 6

Line 10, "and and" should read --and--;
Line 12, "σw $_{45}$" should read --σw$_{45}$--;
Line 24, "etc" should read --etc.--; and
Line 37, "more" should read --even more--.

COLUMN 10

Line 17, "122a," should read --122a--; and
Line 24, "However" should read --However,--.

COLUMN 11

Line 8, "a optical" should read --an optical--;
Line 9, "NAO.055." should read --NAO.55.--;
Line 38, "as the" should read --as in-- and "that in" should read --that the--.

UNITED STATES PATENT AND TRADEMARK OFFICE
CERTIFICATE OF CORRECTION

PATENT NO. : 5,949,743
DATED : September 7, 1999
INVENTOR(S) : TSUTOMU SHIRATORI It is certified that error appears in the above-identified patent and that said Letters Patent is hereby corrected as shown below:

COLUMN 12

Line 16, "on the" should read --in--; and
Line 47, "layer 27," should read --layer 22,--.

COLUMN 12 TABLE 1 under "TRANSISTIONAL METAL"

Line 63, "$Fe_{15}CO_{14}Cr_2$" should read --$Fe_{78}CO_{20}Cr_2$--.

COLUMN 13 TABLE 1 under "TRANSISTIONAL METAL"

Line 9, "$Fe_{35}CO_2Cr_2$" should read --$Fe_{95}CO_3Cr_2$--;
Line 11, "$Fe_{82}CO_{34}Cr_2$" should read --$Fe_{82}CO_{16}Cr_2$--;
Line 13, "$Fe_{45}CO_{15}Cr_2$" should read --$Fe_{83}CO_{15}Cr_2$--; and
Line 15, "$Fe_{98}CO_4Cr_2$" should read --$Fe_{90}CO_8Cr_2$--.

COLUMN 13

Line 37, "rate" should read --range--; and
Line 45, "Hbmin" should read --$Hb_{min}$--.

UNITED STATES PATENT AND TRADEMARK OFFICE
CERTIFICATE OF CORRECTION

PATENT NO.  : 5,949,743
DATED       : September 7, 1999
INVENTOR(S) : TSUTOMU SHIRATORI It is certified that error appears in the above-identified patent and that said Letters Patent is hereby corrected as shown below:

COLUMN 15 TABLE 2

Line 8, "$Fe_{84}Co_{12}Cr_2$" should read --$Fe_{87}Co_{11}Cr_2$--
Line 10, "$Fe_{15}Co_{80}Cr_2$" should read --$Fe_{18}Co_{80}Cr_2$--; and
Line 18, "$Fe_{90}Co_4Cr_2$" should read -- $Fe_{90}Co_8Cr_2$--.

Signed and Sealed this

Twenty-second Day of August, 2000

Attest:

Q. TODD DICKINSON

*Attesting Officer*   *Director of Patents and Trademarks*